United States Patent
Wu

(10) Patent No.: US 7,878,068 B2
(45) Date of Patent: Feb. 1, 2011

(54) DIGITAL PRESSURE SENSOR

(75) Inventor: Tsai-Chao Wu, Taichung (TW)

(73) Assignee: Chanto Air Hydraulics Co., Ltd., Taichung (TW)

( * ) Notice: Subject to any disclaimer, the term of this patent is extended or adjusted under 35 U.S.C. 154(b) by 54 days.

(21) Appl. No.: 12/345,201

(22) Filed: Dec. 29, 2008

(65) Prior Publication Data

US 2010/0139411 A1    Jun. 10, 2010

(51) Int. Cl.
*G01L 7/00* (2006.01)
(52) U.S. Cl. .................................................... 73/714
(58) Field of Classification Search ................. None
See application file for complete search history.

(56) References Cited

U.S. PATENT DOCUMENTS

| | | | | |
|---|---|---|---|---|
| 2,039,016 A | * | 4/1936 | McGuinness et al. | 406/3 |
| 3,711,038 A | * | 1/1973 | Van Otteren | 406/19 |
| 5,299,891 A | * | 4/1994 | Grosswiller et al. | 406/112 |
| 5,562,367 A | * | 10/1996 | Scott | 406/13 |
| 5,850,665 A | * | 12/1998 | Bousset | 15/319 |

* cited by examiner

*Primary Examiner*—Andre J Allen
(74) *Attorney, Agent, or Firm*—Browdy and Neimark, PLLC

(57) ABSTRACT

A digital pressure sensor, which is mounted on a pressure controller of a pneumatic tube system, includes a casing including a control circuit, which has a pressure sensing unit, therein, a display, which has a plurality of displaying units for showing numerals or icons, on a front side connected to said control circuit, and a connection tube on a bottom thereof for communication with a connection tube of the pneumatic tube system that said pressure sensing unit of said control circuit senses a pressure in the tube via said connection tube; and a battery set received in said casing and electrically connected to said control circuit.

4 Claims, 2 Drawing Sheets

DIGITAL PRESSURE SENSOR

BACKGROUND OF THE INVENTION

1. Field of the Invention

The present invention relates to a device for detection of pressure in tubes and more particularly, to a digital pressure sensor for a pneumatic tube system.

2. Description of the Related Art

FIG. 1 shows a conventional pneumatic tube system 1, in which a pressure sensor 2 usually is provided. The pressure sensor usually is provided between the air filter, the pressure controller, and the lubricator. The pressure sensor 2 tells the operators the pressure value in the tube system. Until now, the conventional pressure sensor 2 senses pressure by mechanic actions and displays the result by an analog display so that the conventional pressure sensor cannot provide a precise detection. Typically, the mechanic pressure sensor is affected by temperature change that will cause an error in detection as well.

SUMMARY OF THE INVENTION

The primary objective of the present invention is to provide a digital pressure sensor for detection of pressure in tube system.

The secondary objective of the present invention is to provide a rivet, which may take the broken part of the rivet out easily.

To achieve the objective of the present invention, a digital pressure sensor, which is mounted on a pressure controller of a pneumatic tube system, includes a casing including a control circuit, which has a pressure sensing unit, therein, a display, which has a plurality of displaying units for showing numerals or icons, on a front side connected to said control circuit, and a connection tube on a bottom thereof for communication with a connection tube of the pneumatic tube system that said pressure sensing unit of said control circuit senses a pressure in the tube via said connection tube; and a battery set received in said casing and electrically connected to said control circuit.

DETAILED DESCRIPTION OF THE INVENTION

Figure 1:
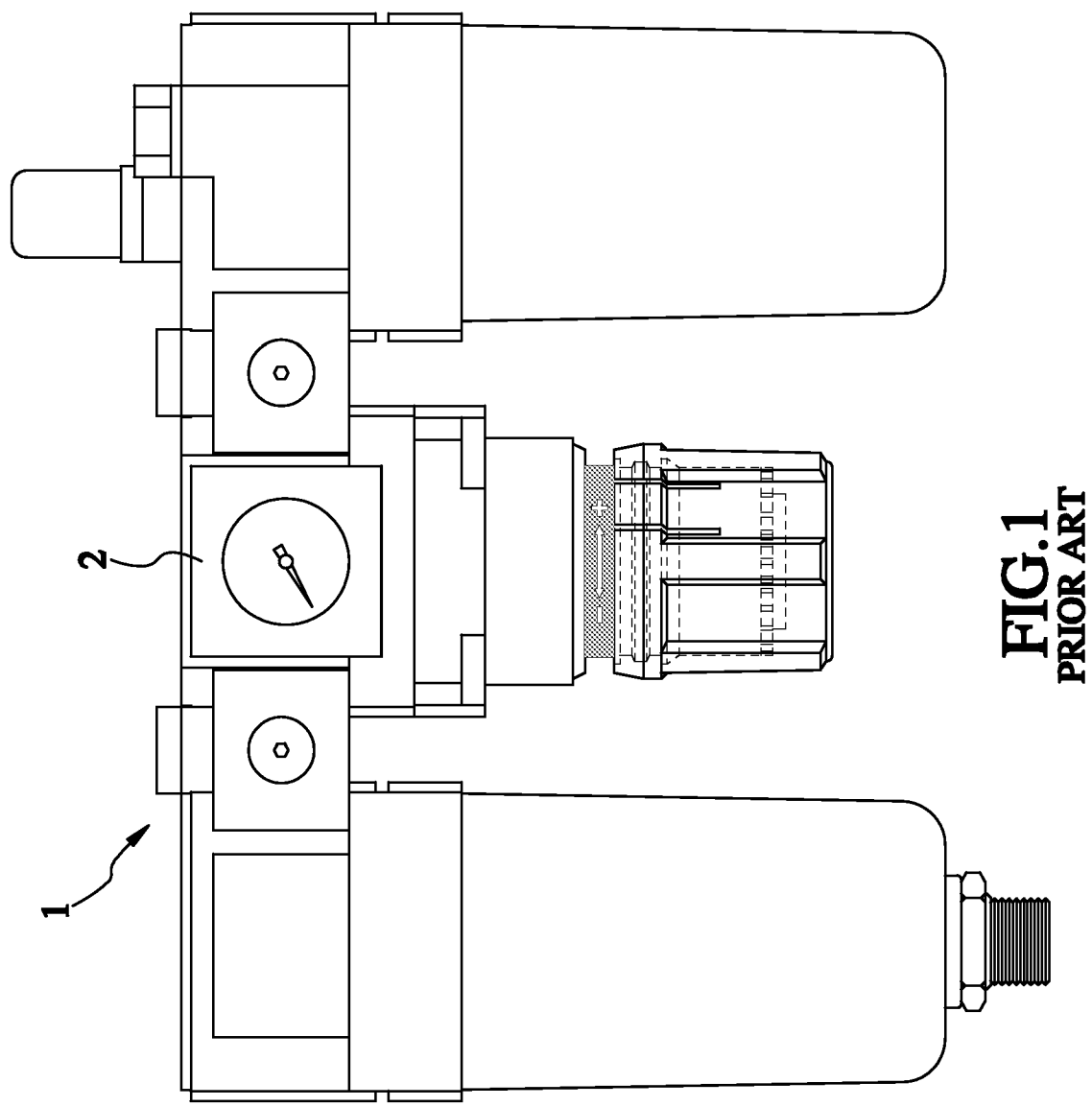
FIG. 1 is a sketch view of the conventional pneumatic tube system.
Figure 2:
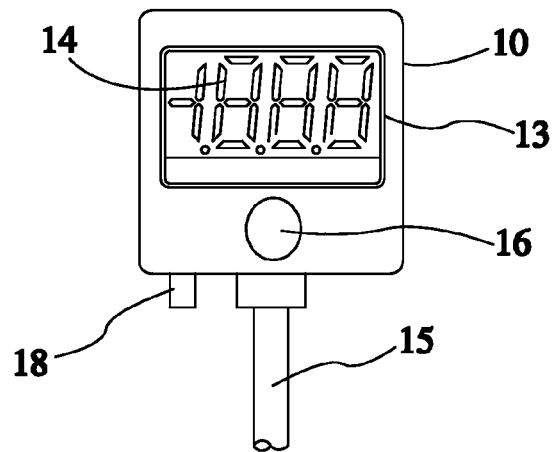
FIG. 2 is a front view of a preferred embodiment of the present invention.
Figure 3:
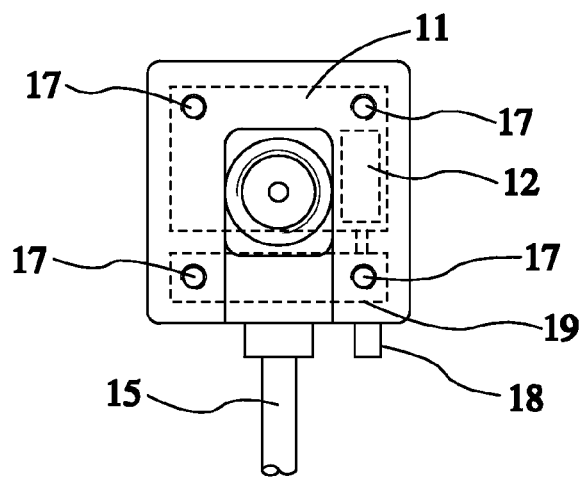
FIG. 3 is a back view of the preferred embodiment of the present invention.
Figure 4:
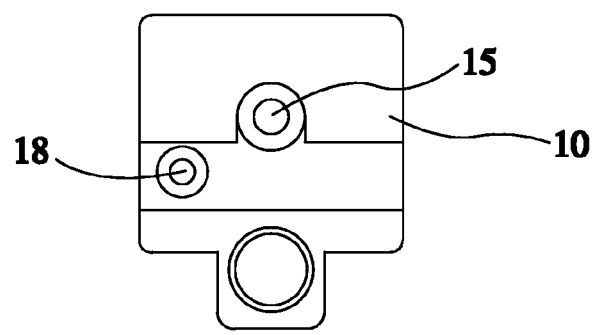
FIG. 4 is a bottom view of the preferred embodiment of the present invention.

Referring to FIGS. 2 to 4, a digital pressure of the preferred embodiment of the present invention usually is mounted in a pneumatic tube system (not shown) around a air filter or a pressure controller. The digital pressure sensor of the present invention includes:

A casing 10 includes a control circuit 11, which includes a pressure sensing unit 12. The casing 10 is provided with a display 13 on a front side thereof connected to the control circuit 11. The display 13 has a plurality of displaying regions 14, each of which may show a numeral or an icon respectively. The casing 10 is provided with a connection tube 15 on a bottom thereof for communication with the pneumatic tube system (not shown) that pressure in the tube system may be sensed by the pressure sensing unit 12. The casing further is provided with a reset button 16 under the display 13 and several threaded holes 17 on a back side thereof for fixing the sensor of the present invention on the tube system by bolts. For example, the digital pressure sensor of the present invention may be fixed to the air filter. The casing 10 is provided with a switch 18 on the bottom connected to the control circuit 11 to turn on or turn off the sensor.

A battery set 19 is provided in the casing 10 and is electrically connected to the control circuit 11 to supply power.

The way and place of mounting the digital pressure sensor of the present invention on the pneumatic tube system is as same as the conventional mechanic pressure sensor. In the present invention, we provide the digital pressure sensor mounted on the air filter and communicated with the tube system via the connection tube 15. After mount on the tube system, one may turn on the switch 18 that the sensing unit 12 will sense the pressure via the connection tube 15 and the displaying regions 14 of the display 13 will show the pressure value automatically. The present invention provides a digital action to sense the pressure that will get a precise detection and has less affection by temperature change. The present invention has overcome the drawbacks of the conventional mechanic pressure sensor. Besides, the present invention provides the battery set to be the power supply that will not have wires in the tube system.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A digital pressure sensor, which is mounted on a pressure controller of a pneumatic tube system, comprising:
   a casing including a control circuit, which has a pressure sensing unit, therein,
   a display, which has a plurality of displaying units for showing numerals or icons, on a front side connected to said control circuit, and a connection tube on a bottom thereof for communication with a connection tube of the pneumatic tube system such that said pressure sensing unit of said control circuit senses a pressure in the tube via said connection tube; and
   a battery set received in said casing and electrically connected to said control circuit.

2. The digital pressure sensor as claimed in claim 1, wherein said casing is provided with a switch on a bottom thereof and connected to said control circuit.

3. The digital pressure sensor as claimed in claim 1, wherein said casing is provided with a reset button on said front side thereof under said display.

4. The digital pressure sensor as claimed in claim 3, wherein said casing is provided with threaded holes on a back thereof for fixing said casing on the pneumatic tube system by bolts.

* * * * *